Aug. 31, 1943.  H. NUTT ET AL  2,328,092
FLUID OPERATED CLUTCH
Filed April 19, 1939   2 Sheets-Sheet 1
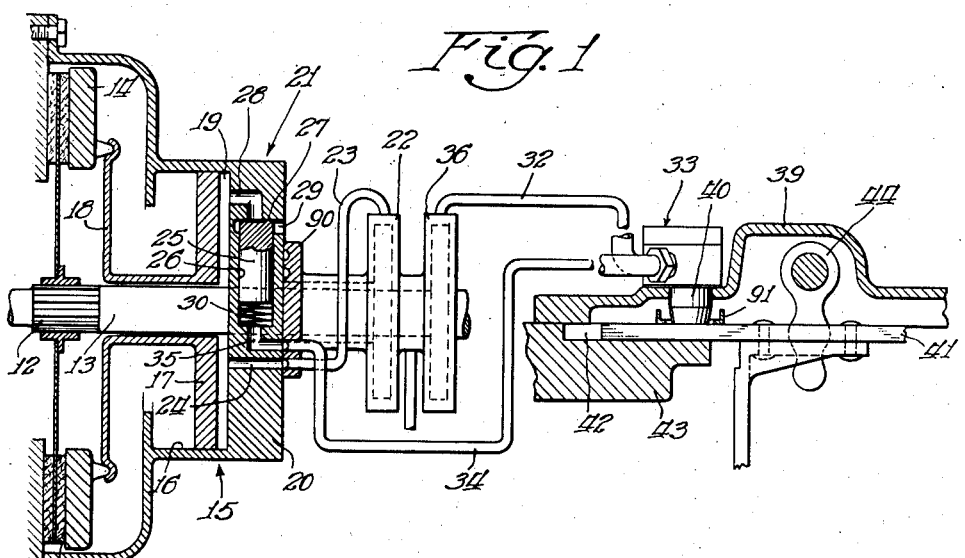
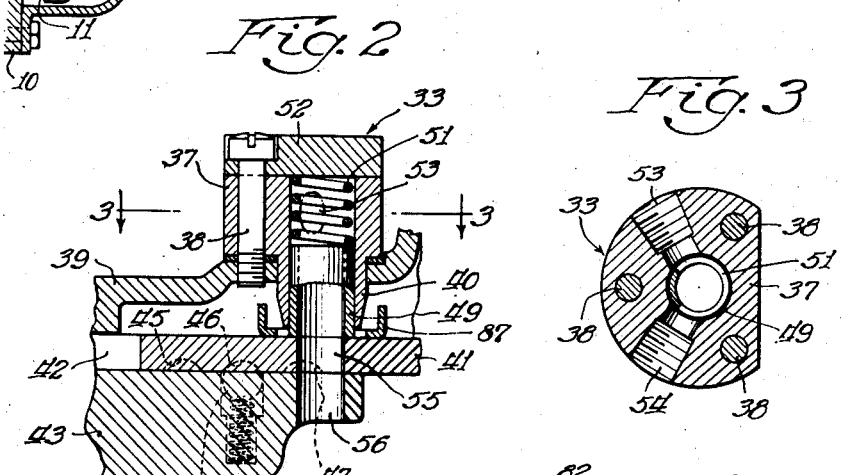
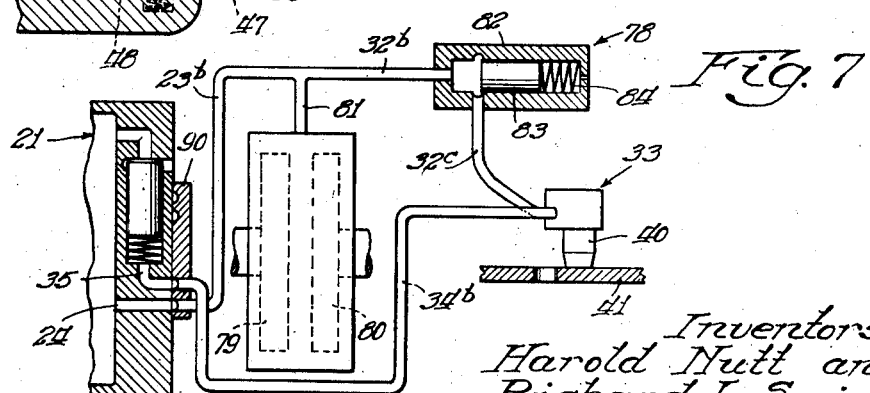
Inventors:
Harold Nutt and
Richard L. Smirl.
By: Edward C. Gritzbaugh
Atty.

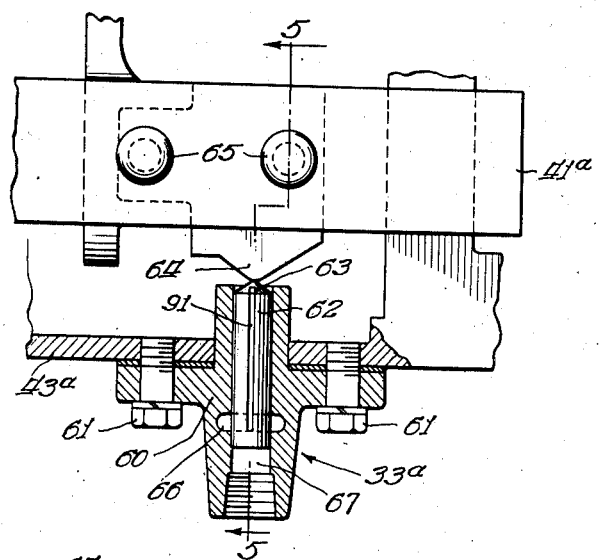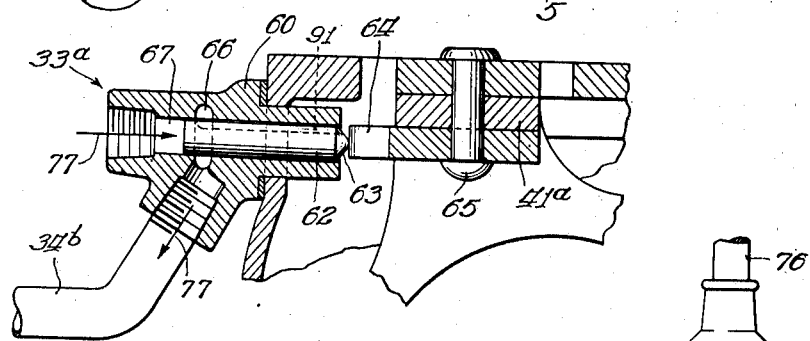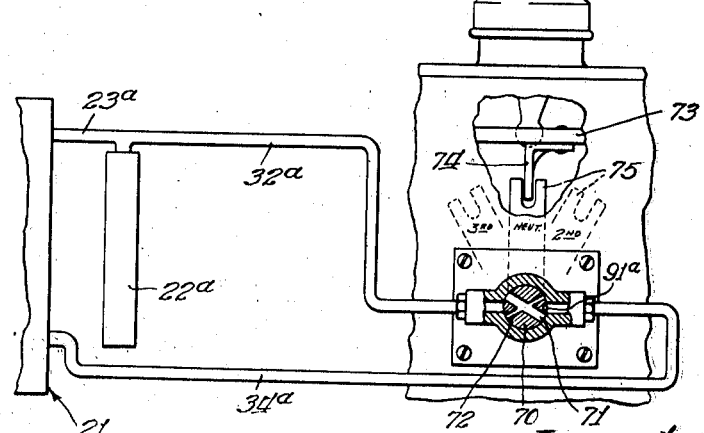

Patented Aug. 31, 1943

2,328,092

UNITED STATES PATENT OFFICE 2,328,092

FLUID OPERATED CLUTCH

Harold Nutt, Chicago, and Richard L. Smirl, Bellwood, Ill., assignors to Borg-Warner Corporation, Chicago, Ill., a corporation of Illinois Application April 19, 1939, Serial No. 268,350

5 Claims. (Cl. 192—3.5)

This invention relates to fluid operated mechanism such as for example, automatic clutches of the fluid operated type. A system of this type is shown in our pending application Serial No. 232,664 filed September 30, 1938. The present invention relates particularly to valve mechanism for controlling the shifting of such a clutch from a centrifugal stage to a locked-out stage of engagement in accordance with the shifting of a conventional change speed gear mechanism from a starting range (intermediate, reverse, or low gear) to driving range (second or high gear).

More broadly, the invention relates to the control of a fluid system of any kind in connection with the shifting mechanism of an automotive vehicle, wherein a valve for opening and closing one of the fluid passages of such fluid system, is operated by direct association with the shift rail of the gear shift mechanism.

An object of the invention is to provide, in connection with a gear shifting mechanism, a valve operated in conjunction with the shift rail thereof, adapted, when the shifting mechanism is in the starting range, to cut off the supply of fluid under pressure from a pump to a device operated by such fluid under pressure, and, when the shifting mechanism is adjusted to the driving range, to cause the fluid under pressure to be delivered to such device.

Another object of the invention is to provide a valve which, although operated directly by the shift rail, will not increase the resistance of the latter to the shifting movement, but on the contrary, may actually decrease such resistance by providing a body of lubricating oil under pressure against which one side of the shift rail may slide in opposition to the pressure of a spring urged detent member cooperating with the other side of the shift rail.

The above and other objects, advantages and uses of our invention will become more apparent from a reading of the following specification and claims taken in connection with the appended drawings which form a part of this specification and wherein:

Fig. 1 is a schematic view of an automatic clutch system in which the invention is incorporated;

Fig. 2 is a detailed sectional view of the valve employed in connection therewith;

Fig. 3 is a horizontal sectional view of the valve taken as indicated by the line 3—3 of Fig. 2;

Fig. 4 is a detailed plan view, partly in section, of a modified form of the valve arrangement;

Fig. 5 is a transverse sectional view of the same taken as indicated by the lines 5—5 of Fig. 4;

Fig. 6 is a schematic view of a third modification of the invention; and

Fig. 7 is a schematic view of a further modification of the invention.

As an illustration of one form in which the invention may be embodied, we have shown in Fig. 1 an automatic clutch system including a driving member such as the fly wheel 10 of an automobile engine, a driven plate 11 splined at 12 upon a driven shaft 13, and a pressure plate 14 adapted to clamp the driven plate 11 between it and the fly wheel 10.

The means for producing the pressure for operating the pressure plate 14 may comprise a fluid motor 15 including a cylinder 16 and a piston 17 therein. The piston 17 may be directly connected to the pressure plate 14 by means of thrust transmitting members shown schematically at 18.

The piston 17 may be acted upon by fluid under pressure delivered into a chamber 19 formed between the piston 17 and the housing 20 of a governor 21, the housing 20 and cylinder 16 being rigidly associated with each other and adapted to rotate with the flywheel 10 and pressure plate 14.

Fluid may be delivered to the chamber 19 by a pump 22 through a suitable duct system indicated schematically at 23, and through a port 24 in the housing 20 of the governor. The duct system 23 includes a suitable manifold 90 for transferring the fluid from stationary to rotatable parts of the mechanism. The showing of the manifold 90 is purely schematic and not intended to disclose the actual structure thereof.

During automatic operation of the clutch, the pressure in the chamber 19 may be automatically governed in accordance with the speed of the governor, by a centrifugal force responsive control valve element 25 which may be slidably mounted in a cylindrical bore 26 in the housing 20 and adapted to seat against a valve seat 27 and to thereby control the escape of surplus fluid through a port 28 and a port 29.

The control valve 25 schematically represents only one form of control element disclosed in pending application Serial No. 232,664, although any of the types disclosed therein may be used in the combination to be described.

Centrifugal operation of the clutch under the control of the valve 25, may take place during the starting range of gear ratios, including neutral, first gear and reverse.

When the transmission is shifted to the driving range, it becomes desirable to lock the clutch in engagement so that the vehicle may be allowed to slow down, for example, for driving in traffic, below the speed at which declutching would normally take place under the centrifugal control without the clutch becoming disengaged. To this end, provision is made for delivering fluid under pressure into the bore 26 behind the piston 25, so as to force it against its seat with a pressure substantially equal to that acting against its forward end through the port 28. In doing so, the pressure of the fluid against the forward end of the valve, tending to unseat it, is neutralized and either centrifugal force or a light spring 30 may maintain the valve in closed position and thereby maintain the clutch in engagement.

For thus delivering fluid under pressure behind the valve element 25, we provide a separate pump 36 which discharges into a fluid line 32 leading through a valve 33 to a line 34 which delivers the fluid to a port 35 communicating with the rear end of the chamber 26.

In its preferred form, the valve 33, as shown in Fig. 2, comprises a casing 37, secured by screws 38 to the cover 39 of the transmission, and having a nozzle 40 projecting through an opening in the cover 39 into association with the shift rail 41 of the shifting mechanism.

The shift rail 41 may be of any conventional type, suitably mounted for longitudinal sliding movement such as in a slot 42 formed between the cover 39 and the transmission housing 43. It may be controlled by a shift lever 44 in a well known manner, and adapted to shift to any one of three positions as determined by recesses 45, 46 and 47 respectively in its underside, cooperating with a spring-pressed ball 48 mounted in the transmission housing 43.

Within the nozzle 40 of the valve 33, is slidably mounted a bushing 49. The bushing 49 is urged downwardly into contact with the shift rail by a coil spring 51 compressed between the upper end of the bushing 49 and a cap 52 which closes the upper end of the valve housing 37.

The fluid lines 32, 34 communicate through ports 53, 54 respectively with the interior of the valve housing 37.

When the shift rail is in the position of neutral gear setting, as determined by the engagement of the ball 48 with the recess 46, the bushing 49 registers with a port 55 in the shift rail 41, the port 55 in turn registering with a port 56 in the transmission housing 43, aligned with the bushing 49. As a result, fluid delivered from the pump 36 will return to the reservoir of the system, and no pressure will be delivered to the fluid line 34. The fluid in the line 34 and below the valve element 25 will also be vented at the port 55 under this condition, which will permit the valve element to move freely in response to centrifugal force.

On the other hand, when the transmission is adjusted to second gear, as determined by the engagement of the ball 48 in a recess 45, or to high gear, as determined by the engagement of the ball 48 in the recess 47, the bushing 49 will be in register with an imperforate portion of the shift rail 41 on one side or the other of the port 55, and the escape of the fluid through the port 56 will thereby be cut off, allowing the pressure in the fluid line 34 to build up to approximately that being delivered from the pump 36. This pressure may be substantially the same as that delivered from the pump 22 so as to balance the pressure against the outer end of the valve element 25 as hereinbefore stated.

The body of fluid in the bushing 49 will exert substantially frictionless reaction pressure against the upper surface of the shift rail 41, in opposition to that of the spring loaded ball 48, tending to remove to a large extent the load which would otherwise be transmitted to the surfaces of the reaction member 87.

The ports may be so arranged that when the shift rail is in second gear, there may be a slight communication between the port 55 and the bushing 49 so as to allow a leakage through the port 56 such that the lockup in second gear will be delayed enough to permit centrifugally controlled engagement. In high gear no leakage will be allowed through the port 56.

In the form of the invention shown in Fig. 4, the valve 33a may comprise a valve housing 60 secured as at 61 to a side wall of the transmission housing 43a, and having a valve plunger 62 with a conical nose 63 engaged by a triangular-shaped cam element 64 secured as at 65 to the shaft rail 41a. The valve piston 62 may move from a closed position as shown in Fig. 4 wherein it cuts off communication between the ports 66 and 67 of the valve, to an open position wherein it established communication between the ports 66 and 67. Movement to open position may be effected by fluid pressure against the end of the plunger, the direction of fluid flow being as indicated by the arrows 77. In the open position, fluid under pressure may be allowed to flow through the lockout fluid line 32, 34 so as to lock out the centrifugal valve plunger 25 and in the closed position, the circulation of the fluid through this line may be cut off, and the vent provided by the longitudinal groove 91 in the valve plunger 62 will allow the fluid in the line 34b and below the centrifugal valve element 25 in Fig. 1 to have free exit for providing unrestricted movement of valve 25 under centrifugal action. The operating cam 64 may be unsymmetrical as shown to provide a restricted passage in the second gear position.

In the form of the invention shown in Fig. 6, the valve is shown as being in the form of a simple rotatable two-way valve including a rotatable valve element 70 having a full sized port 71 adapted to establish communication between the fluid lines 32a and 34a when the transmission is adjusted to high gear, and a restricted port 72 adapted to establish communication between the fluid lines 32a and 34a when the transmission is adjusted to second gear.

The valve 70 may be operated by movement of the shift rail 73, communicated by a finger 74 thereon, to the operating lever 75 of the valve. A manual control lever 76 is shown as the means for moving the shift rail 73.

When the shift rail 73 is adjusted to the neutral position, (when the transmission is in neutral, reverse, or first gear) the valve may be closed as shown in Fig. 6, thus cutting off communication between the lines 32a and 34a, the longitudinal groove 91a serving as a vent to the fluid in the line 34a as in the case of the groove 91 of Fig. 5.

The valve shown in either of Figures 4 and 6 may be employed in connection with a closed system of a type wherein a single outlet pump 22a may supply fluid under pressure both to the centrifugal port 24 of the governor, and to the lockout port 35 of the governor. The pump 22a may be of the double rotor type illustrated in Fig. 7 and described hereafter. The line for delivering the oil to the centrifugal port 24 is indicated at 23a.

The preferred form of valve shown in Figure 2, also may be employed in a circuit having a single outlet pump, as shown in Figure 7, when used in connection with a pressure maintaining valve such as that indicated generally at 78 in Figure 7.

In the arrangement of Figure 7, we have illustrated a single outlet pump having two rotors, indicated in dotted lines at 79 and 80 respectively, one driven by the engine and the other driven by the vehicle through the propeller shaft and transmission, the pump having a single outlet 81 common to both rotors.

In this arrangement, the outlet 81 is adapted to deliver fluid through the fluid line 23b to the port 24 for centrifugal operation, and through the line 32b, 32c, and 34b to the port 35 for lock-out operation.

The valve 78, interposed between the pipes 32b and 32c of the lock-out line, comprises a valve casing 82 and a valve element 83 therein urged by the pressure of a spring 84 toward a closed position wherein it cuts off communication between the pipes 32b and 32c. The valve 83 is arranged to be acted upon by the fluid pressure in the pipe 32b so as to recede against the opposition of the spring 84 and allow fluid to pass through the pipe 32c. The load of the spring 84 on the valve plunger 83 is adjusted to a point slightly less than the opposing load due to the governed pressure of the pump, i. e. the pressure at which the conventional relief valve of the pump will open to by-pass excess fluid therefrom.

The function of the valve 78 is to maintain pressure in the fluid line 23b for normal centrifugal operation when the valve 33 is open so as to release the pressure in the line 32c, 34b for the purpose of rendering the lock-out mechanism inoperative as hereinbefore described. When the valve 33 is opened by the adjustment of the shift rail to the starting range of gear ratios, the valve 78 becomes an auxiliary relief valve or governing valve for maintaining the pressure in the automatic side of the system at a proper working level which may be slightly below that governed by the normal relief valve of the pump, but adequate for centrifugal operation. At the same time, the opening of the valve 33 releases the pressure in the lock-out port 35 so as to render the lock-out mechanism inoperative.

On the other hand, when the valve 33 is closed to exhaust, the path of escape of the fluid through the valve 33 will be closed off, and the pressure in the pump will rise slightly to the level governed by the pump itself, thereby opening the valve 78 so as to allow the full discharge of the pump to be transmitted through the fluid line 32b, 32c, 34b, to the lock-out port 35, thereby effecting lock-out.

In the form of the invention shown in Figure 7, provision is made for push starting of the vehicle. For a push start, fluid is delivered by the transmission driven pump 80 to the common outlet 81 and the fluid line 23b and 32b into the clutch chamber 19 and to the valve 78, respectively. The valve 78 opens under the pressure of the fluid and permits the fluid to pass through the line 32c, the valve 33 and the fluid line 34b to the port 35 communicating with the rear end of the centrifugal valve bore, thus closing the vent and permitting fluid pressure to build up in the clutch chamber 19. As a prerequisite to this operation, the transmission is shifted to the driving range.

We claim:

1. In an automotive vehicle pressure fluid system in combination with a transmission shift rail, having an opening therethrough, a valve cooperating with said rail, said valve including a chamber having an open end adapted to be closed by said rail when the latter is in one position of adjustment, and to be opened by the registering therewith of said opening in the rail when the latter is in another position of adjustment.

2. In an automotive vehicle pressure fluid system in combination with a transmission shift rail, having an opening therethrough, and a spring pressed latching device cooperating with one side of said rail for latching it in its several positions of adjustment, a valve cooperating with said rail, said valve including a chamber having an open end in engagement with the opposite side of said rail and adapted to be closed by said rail when the latter is in one position of adjustment, and to be opened by the registering therewith of said opening in the rail when the latter is in another position of adjustment, and means for maintaining in said chamber a body of fluid under pressure whereby to maintain a substantially frictionless reaction pressure against said rail in opposition to the pressure of said latching device when said rail is in a position other than that in which said chamber is opened.

3. In an automotive vehicle pressure fluid system in combination with a transmission shift rail, and a spring pressed latching device cooperating with one side of said rail for latching it in its several positions of adjustment, a chamber having an open end in engagement with the opposite side of said rail, and means for maintaining in said chamber, when said rail is in certain of its positions of adjustment, a body of fluid under pressure whereby to maintain a substantially frictionless reaction pressure against said rail in opposition to the pressure of said latching device.

4. In combination with a vehicle transmission shifter having a starting and a driving range of gear ratio adjustments, a fluid system including a fluid operated device adapted to perform one function by means of fluid under pressure delivered to it through one branch of said fluid system, means operated by fluid under pressure delivered through another branch of the fluid system for causing said device to perform a modified function, and a valve operated in unison with the movement of said shifter, adapted to release the pressure in said other branch so as to render said last means inoperative to produce said modified function, said shifter comprising a longitudinally slidable rail having a cam surface, and said valve comprising a housing and a valve plunger slidable therein and having a projecting end engageable with said cam surface.

5. In combination with a vehicle transmission shifter having a starting and a driving range of gear ratio adjustments, a fluid system including a fluid operated device adapted to perform one function by means of fluid under pressure delivered to it through one branch of said fluid system, means operated by fluid under pressure delivered through another branch of the fluid system for causing said device to perform a modified function, and a valve operated in unison with the movement of said shifter, adapted to release the pressure in said other branch so as to render said last means inoperative to produce said modified function, said shifter comprising a longitudinally slidable rail having an opening therein and said valve comprising a housing and an open ended bore, a sleeve slidable in said bore, projecting from the open end thereof and adapted to register with the opening in the rail when the rail is in one of its positions of adjustment, and a spring urging said sleeve into engagement with the surface of said rail.

HAROLD NUTT.
RICHARD L. SMIRL.